April 2, 1968  TATSUMI OKAMOTO ETAL  3,376,152
METHOD FOR FORMING A RESIN LINING INSIDE A METAL PIPE
Filed March 4, 1964  3 Sheets-Sheet 1
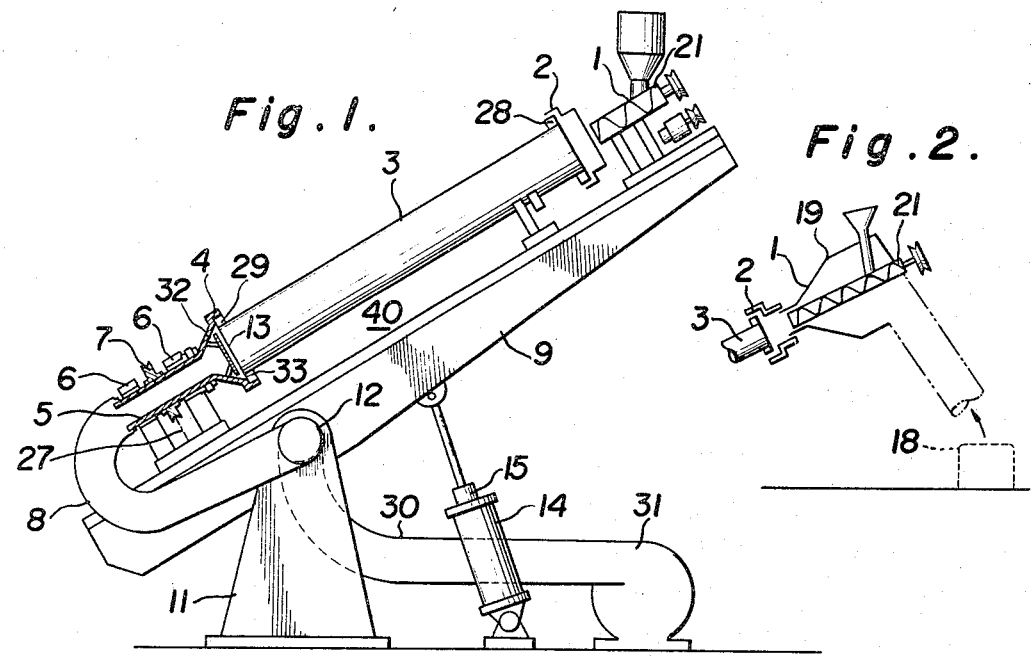
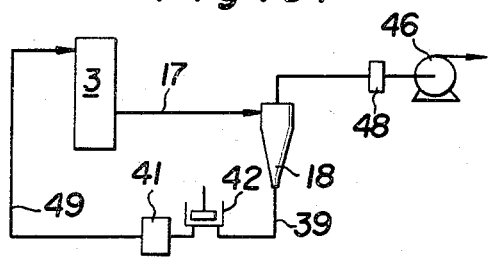
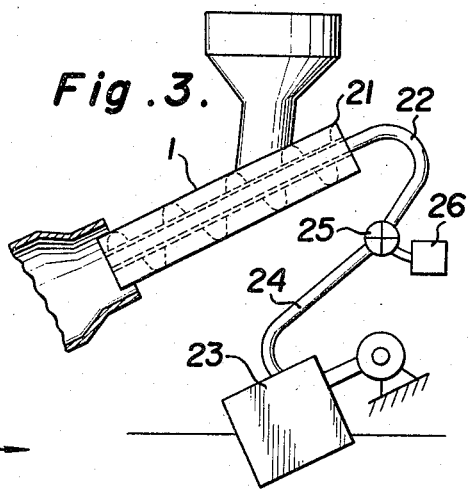
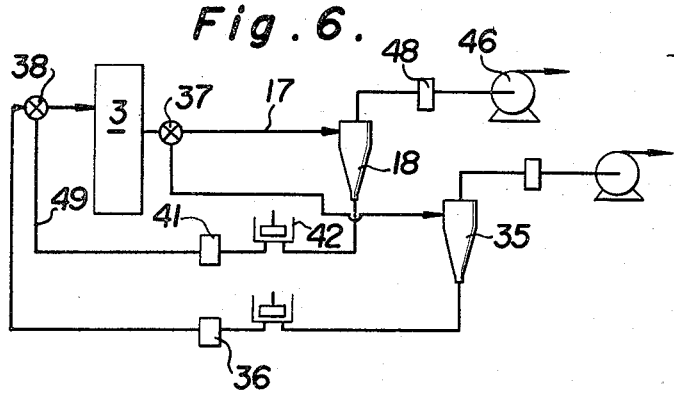
INVENTORS.
TATSUMI OKAMOTO
ATSUO HIRAYAMA
SHUMPEI KAWANAMI
YOSHIHIRO NISHIKAWA
ATTORNEY April 2, 1968  TATSUMI OKAMOTO ETAL  3,376,152
METHOD FOR FORMING A RESIN LINING INSIDE A METAL PIPE
Filed March 4, 1964  3 Sheets-Sheet 2
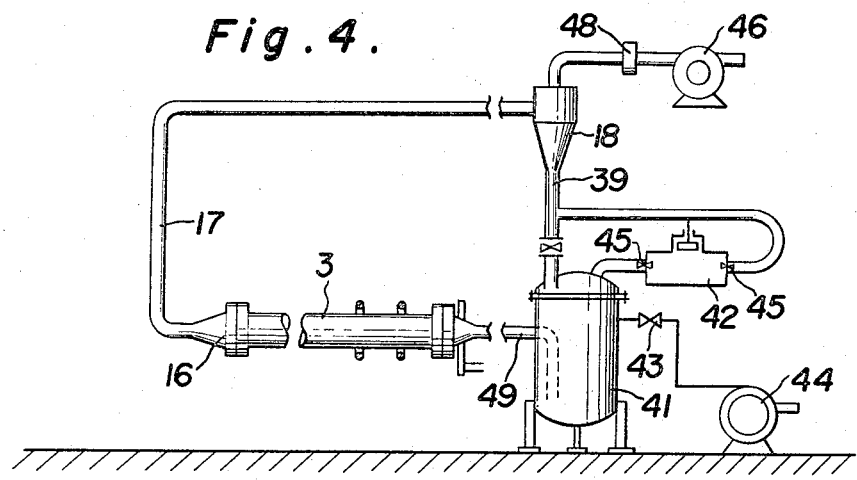
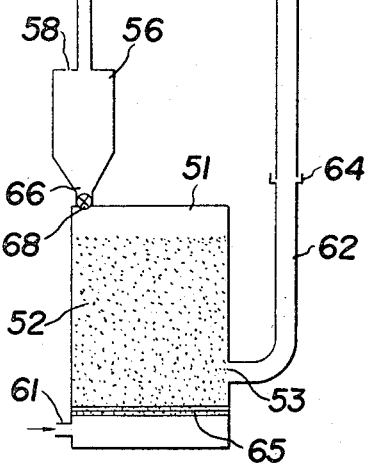
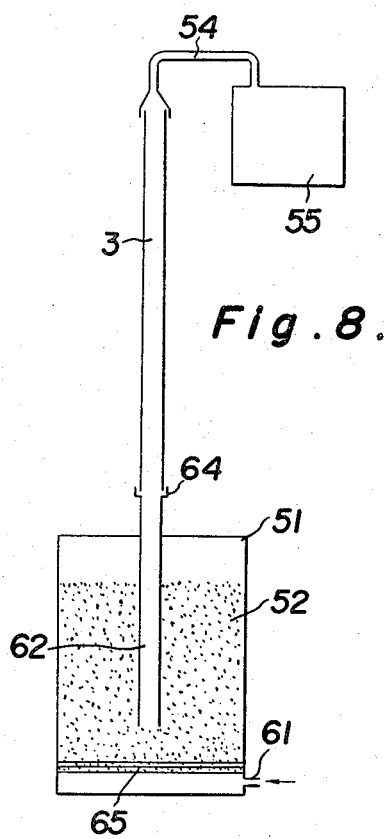
INVENTORS.
TATSUMI OKAMOTO
ATSUO HIRAYAMA
SHUMPEI KAWANAMI
YOSHIHIRO NISHIKAWA
ATTORNEY

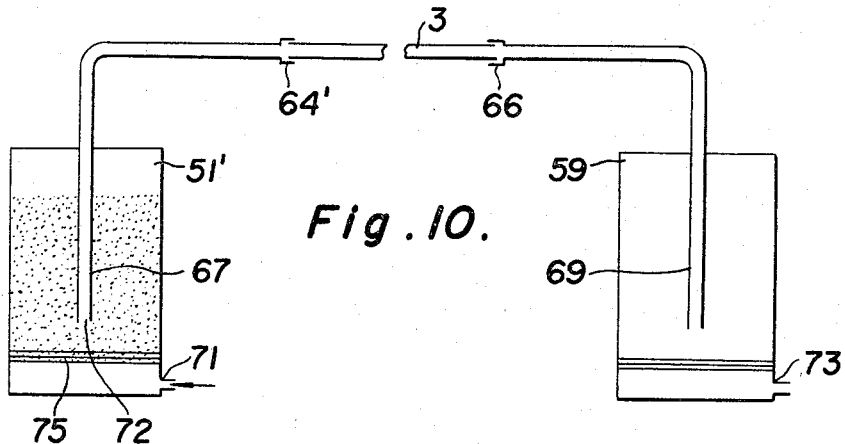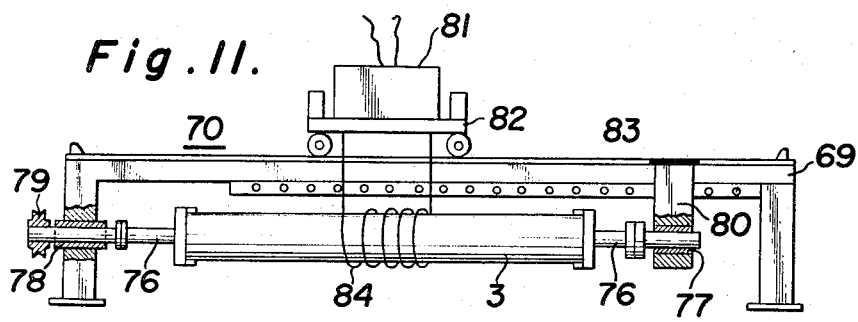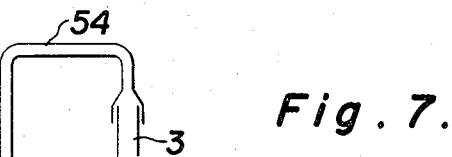

United States Patent Office 3,376,152
Patented Apr. 2, 1968

3,376,152
METHOD FOR FORMING A RESIN LINING INSIDE A METAL PIPE
Tatsumi Okamoto, 914 Totsuhon-machi, Kakura-ku, Kitakyushu-shi, Japan; and Atsuo Hirayama, 248–13 Ooi-Hayashi-cho, Shinagawa-ku; Shumpei Kawanami, 1109 Higashi-Oizumi-cho, Nerima-ku; and Yoshihiro Nishikawa, 130–1 Kamihoyashinden, Hoya-cho, Kita-Tama-gun, all of Tokyo, Japan
Filed Mar. 4, 1964, Ser. No. 349,308
2 Claims. (Cl. 117—18)

ABSTRACT OF THE DISCLOSURE

Method of lining a metal pipe with resin which includes preheating the pipe to a temperature to cause adherence of the resin, rotating the pipe, feeding synthetic resin rapidly into the pipe, adhering the resin to the interior of the pipe by the heat applied during the preheating, guiding the resin outwardly around a baffle and through a narrow opening at the lower end of the pipe to coat the flanged end of the pipe.

---

The present invention relates to improvements in a method and apparatus for lining a metal pipe with a resin. An object of the invention is the provision of a method whereby the resin lining inside a long metal pipe may be surely and easily formed, this previously being considered difficult to do.

It has previously been difficult to evenly heat every part of a long pipe for the purpose of forming a lining inside the pipe. A thermo-plastic resin compound inside the pipe is heated up to different temperatures along the pipe, thus forming an uneven thickness of the resin lining and to forming a rough inner surface such as granular, netty, and the like on the lining inside the pipe, and furthermore when the pipe is inclined, the lower part of the lining becomes thicker, so that the resulting pipe has such a drawback that it is unsuitable to use it for transporting liquid chemicals and the like.

In accordance with one aspect of the invention, a method of lining a metal pipe with a resin, comprises the steps of heating the pipe up to an elevated temperature while simultaneously rotating the pipe, feeding a synthetic resin compound rapidly into the pipe, lining the pipe with the synthetic resin compound by heat given to the pipe during the heating, and removing an excess of the compound used for the lining the pipe by carrying the excess compound with a gas interchanged rapidly between the inside and outside of the pipe.

The invention will be described further, by way of example, with reference to the accompanying drawings, in which:

FIG. 1 is a schematic side view of a lining apparatus constructed in accordance with the invention;
FIG. 2 is a schematic view of a detail of such an apparatus as shown in FIG. 1, but modified somewhat;
FIG. 3 is a similar view to FIG. 2, but further modified;
FIG. 4 is a schematic view of one embodiment of the invention; in which a cyclone and an accumulator are provided;
FIG. 5 shows a piping diagram for the embodiment shown in FIG. 4;
FIG. 6 is a similar view to FIG. 5 of another embodiment in which another cyclone and another accumulator are provided;
FIGS. 7 to 10 show still further embodiments of this invention; and
FIG. 11 is a schematic view of a heating means for heating the metal pipe.

Referring more particularly to the drawings, the preferred embodiments of this invention will now be described; however, this description will be understood to be illustrative of the invention and not as limiting it to the particular embodiments shown and described. There is a thermo-plastic synthetic resin compound feeding means 1 in FIGS. 1, 2 and 3. A compound of a thermoplastic synthetic resin such as polyethylene is fed into a pipe 3 to be lined from the feeding means 1. While there is illustrated a conventional screw-feeder type feeding means 1 in FIG. 1, a modified type is shown in FIG. 3. The modified type has a rotary screw shaft 21 comprising a hollow tube, inside which a compressed air pipe 22 is inserted. The compressed air supplied from the compressed air pipe 22 is blown into the pipe 3 so as to accelerate the resin compound fed into the pipe 3 from the feeding means 1 by means of the screw-feeder. An excess of resin compound within the pipe 3 is blown off after the above feeding has ended.

In FIG. 3, there is further shown a primer reservoir 23 which is communicated with the compressed air pipe 22 through a connecting pipe 24 provided with a transfer valve 25. A primer is admitted into the pipe 3 by these means just before the resin compound is fed into it under pressure. The primer is fed at a rate of about 10 kg. per minute with air blast of 5 m.³ per minute for about 5 seconds into the pipe 3 heated up to a temperature of 270° C., whereby the formation of the resin lining in the subsequent resin lining operation facilitated. In this case the pipe 3 is a gas pipe of 6 inches in diameter, 5.5 meters in length, arranged at an inclination of 45° and rotated on its axis at a rate of 80 r.p.m. There is also provided an air compressor 26 to which it is capable of transferring the compressed air pipe 22 by means of the transfer valve 25 so as to carry the above-mentioned "blow in" and "blow off" operations into effect. A cap 2 is provided on the top of the pipe 3 as shown in FIG. 1, through which the resin compound, the primer, and the compressed air are admitted into the pipe 3. Another cap 4 is provided on the bottom of the pipe 3. The cap 4 is combined with one end of a driven tube 5 supported by bearings 6 and having a pulley 7. The driven tube 5 is rotated by a belt 27 running over the pulley 7 and driven by a motor (not shown) through the intermediate of a reduction gear (not shown). The other end of the driven tube 5 is connected with one end of a suction tube 8. The other end of the suction tube 8 is connected with an extension 30 of a suction pump 31 so as to draw a draught out of the inside of the pipe 3 together with the primer and the resin compound under a desired suction pressure. Practically, it is preferred to keep the suction pressure at about 200 mm. with the air blast of 5 m.³/min. Thus in the embodiment shown in FIG. 1, an excess of compound left in the pipe 3 after the same has been admitted into the pipe 3 from the feeding means 1 is drawn off out of the pipe 3 by the driven tube 5, suction tube 8, and the suction pump 31.

The pipe 3 is supported indirectly by a frame 9 which is, in turn, supported inclinably by a stand 11. A hydraulic cylinder 14 provided with a piston 15 is used for inclining the frame 9 as desired. The frame 9 is connected with the stand 11 by a hollow shaft 12, by which the suction tube 8 is also connected with the extension 30.

There is a baffle plate 13 facing the bottom flange 29 of the pipe 3. The baffle plate 13 is supported by the inner wall 32 of the bottom cap 4 and has a size and shape corresponding to the flange 29 and larger than the cross-section of the inside of the pipe 3 so that the compound and the primer drawn out of the inside are led by a narrow passage 33 between the flange 29 and the baffle plate 13 for the purpose of lining the flange 29 as desired.

FIG. 2 illustrates a modification in which the feeding means 1 is provided with an outer passage 19 for the compressed air, one end of which is engaged with the top cap 2 and the other end of which is connected with a compressor or the like 18 so as to blow the primer and the compound into the pipe 3 and also blow off excess primer and compound out of the pipe 3.

In another embodiment shown in FIG. 4, a cyclone and compressor are used. An outlet 16 of a pipe 3 to be lined is connected with an inlet arranged in the upper side of the cyclone 18 through an exhaust pipe 17. A return pipe 39 arranged in the bottom of the cyclone 18 is provided for returning the lining material into reservoir 41 through a pump 42. Compressed air is supplied into the reservoir 41 by a corpressor 44 through a compressed air inlet valve 43. The pump 42 is provided with check valves at its inlet and outlet. The cyclone 18 is connected at its top with an exhaust blower 46 through a filter 48 to draw off air from the cyclone 18. The lining material stored in the reservoir 41 is fed from the reservoir 41 and into the pipe 3 through a feeding pipe 49.

FIG. 5 is a flow diagram for the arrangement shown in FIG. 4.

The embodiment shown in FIG. 6 is provided with another cyclone and another reservoir in addition to the arrangement shown in FIGS. 4 and 5. The cyclone 35 and the reservoir 36 are provided for applying a primer. Two transfer valves 37 and 38 are used for transferring the pipes 17 and 49 to the cyclone 35 and the reservoir 36, respectively. In operation, the primer is supplied into the pipe 3 from the accumulator 36 by means of the cyclone 35 for the purpose of lining the pipe 3 with the primer to obtain a thin primer lining. Then the two transfer valves 37 and 38 are transferred so as to feed the thermoplastic synthetic resin compound into the pipe 3 from the reservoir 41 by means of the cyclone 18.

In operation of the arrangement shown in FIG. 6, a 550 cm. long gas pipe having an inner diameter of 6 inches was lined. The pipe was rotated on its axis at a rate of 80 r.p.m. and arranged at an angle of 45° in inclination. After having been heated up to a temperature of 270° C., a primer was supplied into the pipe conditional on:

| | |
|---|---|
| Input rate of primer | 10 kg./min. |
| Period of the primer supply | 5 seconds. |
| Suction pressure and air blast for the primer supply | 200 mm., 5 m.³/min. |
| Suction pressure, air blast, and period of removing an excess of the primer | 200 mm., 20 m.³/min., 2 to 5 sec. |

Just after the excess primer had been removed, polyethylene compound was supplied into the primer-lined pipe conditional on:

| | |
|---|---|
| Input rate of the compound | 8 kg. /min. |
| Period of the compound supply | 2 minutes. |
| Suction pressure and air blast for the compound supply | 200 mm., 5 m.³/min. |
| Suction pressure, air blast, and period of removing an excess of the compound | 200 mm., 20 m.³/min., more than 10 sec. |

The yielding lining was smooth and had a thickness of 1 mm.

FIGS. 7 and 8 show a reservoir 51 filled with a thermoplastic or thermo-setting synthetic resin compound 52. The reservoir 51 is provided with a gas inlet 61 from which a compressed gas such as air or nitrogen is admitted into the reservoir. In FIG. 7, the gas inlet, 61 is arranged in the top wall of the reservoir 51 while, in FIG. 8 it is arranged near the bottom wall of the reservoir 51. The gas inlet 61 may be arranged anywhere in the wall of the reservoir 51. The reservoir 51 is provided also with a conduit 62, one end of which opens near the bottom of the reservoir 51. In FIG. 7, it opens in the side wall of the reservoir 51 near the bottom thereof, while, in FIG. 8, the conduit 62 extends from the top wall of the reservoir 51 downwards into the inside and opens near the bottom of the reservoir 51. Numeral 65 in FIG. 8 represents a false bottom which is permeable but does not transpire the resin compound 52. The upper end of the conduit 62 is provided with a flange 63 or a receiving flange 64 (FIG. 8) on which a pipe 3 to be lined is connected therewith air-tightly. The other end of the pipe 3 is connected with an overflow pipe 54 airtightly which leads to a receiver 55. The pipe 3 is heated up to a temperature which is above the melting point of the synthetic resin compound 52. Although a straight pipe 3 is illustrated in FIGS. 7 and 8, it is also possible to arrange an angle pipe, a coiled pipe, or the like instead of the straight one.

FIG. 9 illustrates still another embodiment. There is provided a closed reservoir 51 having a false bottom 65. A compound is contained above the false bottom 65 in the reservoir 51. The reservoir 51 is provided with a gas inlet 61 under the false bottom 65 so as to admit a gas such as air or nitrogen into the space under the false bottom 65 which is provided to pass the gas upwardly but not to pass the compound downwardly. A conduit 62 is extended from the reservoir 51 at 53 in the side thereof near the false bottom 65. On the top end of the conduit 62 is provided a receiving flange 64 to receive the bottom end of a pipe 3 to be lined. The pipe 3 has been heated up to a temperature of a melting point of the compound. The top end of the pipe 3 is connected with a returning pipe 54 leading to a receiver 56. The pipe 3 is sealed air-tightly at the connections between it and the flange 64 and also between it and the returning pipe 54. The receiver 56 is provided with a gas exhaust 58 communicated with the atmosphere at the top and a check valve 68 at the bottom end of a funnel 66 constituting the bottom of the receiver 56. The check valve 68 is so constructed as to pass the compound collected in the receiver 56 downwardly but not to pass the compressed gas upwardly.

In a still further embodiment illustrated in FIG. 10, two reservoirs 51' and 59 are provided. They have gas inlets 71 and 73 and conduits 67 and 69, respectively. The upper ends of the conduits 67 and 69 are turned to each other and provided with receiving flanges 64' and 66 so as to hold the pipe 3 to be lined therebetween airtightly. The pipe is heated up to a temperature above the melting point of the compound. Subsequently, compressed gas carrying the compound is passed, for example, from the reservoir 51' to the other reservoir 59 through the pipe 3, and, for the next cycle of the operation compressed air and the compound are passed reversely, that is, from the reservoir 59 to the reservoir 51'.

In the constructions shown in FIGS. 7 through 10 it is preferred that the gas inlet 61 or 71 is arranged as remotely as possible from the start 53 or 72 of the conduit 62 or 67.

In FIG. 11, an example of the heating means 70 for preheating the whole of the pipe 3 to be lined is illustrated. There is a horizontal frame 69. A head stock is provided in a stand of the frame 69 and has a bearing 78. A tail stock is slidably arranged on the frame 69 being suspended therefrom so as to be adjustable a distance between the head stock and the tail stock. The tail stock is provided with a tail stock bearing 77 in alignment with the head stock bearing 78. Two arms 76 are held by the head and tail stock bearings 78 and 76 and adapted to carry the pipe 3 therebetween horizontally and coaxially. Beyond the head stock on the arm 76, a pulley 79 is mounted so as to drive the arm 76 and the pipe 3 by a motor (not shown). A truck 82 is adapted to reciprocate on rails 83 provided on the frame 69 and loaded with a high frequency transformer 81. A high frequency heating coil 84 is adapted to surround a portion of the pipe 3 and to reciprocate along the whole length of the pipe 3 together with the reciprocation of a transformer 81 with which the coil 84 is connected, the transformer 81 being mounted on the truck 82.

By virtue of this invention constituted as above, the compound is made to pass through the pipe to be lined within a period of about 20 seconds: the compound is accelerated when it is admitted into the pipe and is blown off and/or drawn out of the pipe when an excess of compound is removed out of the pipe, resulting in a forming of a desirable lining. In this case, it is essential that the staying period of the compound within the pipe is less than 20 seconds. In addition, it is to be noted that it is provided to incline the pipe steeply and quickly together with relative arrangements so as to follow this provision.

In order to line the flange provided on an end of the pipe, a baffle plate is provided in accordance with this invention, whereby it is possible to line the flange well so as to adapt the pipe to transport liquid chemicals.

In accordance with this invention, a cyclone and a compressor are used. The former is used for drawing the excess compound out of the lined pipe while the latter is used for blowing in the compound into the pipe to be lined. In addition, it is possible to return the excess compound by adapting the cyclone to connect with the compressor. Therefore, the whole lining arrangement becomes compact and the operation thereof becomes easy.

In accordance with this invention, a means is used both as a blowing in means and a blowing off means or both as a drawing in means and a drawing out means. Therefore, the whole lining arrangement is simplified.

Further in accordance with this invention, another cyclone is provided for admitting a primer into the pipe before a compound is applied, whereby the lining subjected to the pipe becomes remarkably desirable and, in addition, the operation becomes easy notwithstanding the simplified construction.

While particular embodiments of the invention have been illustrated and described, modifications thereof will readily occur to those skilled in the art.

What we claim is:

1. A method of lining a metal pipe with a thermoplastic resin material which comprises
   rotating the pipe with the longitudinal axis of the pipe inclined with respect to the horizontal,
   pre-heating the rotating pipe to a predetermined resin adherent temperature,
   feeding resin rapidly into the pipe during the rotation,
   adhering the resin to the pipe by the heat supplied during the preheating,
   discharging the resin at the lower end of the pipe through a narrow space to force the resin outwardly, and
   removing excess resin material from the pipe by differential pressure between the ends of the pipe.

2. A method of lining a metal pipe as defined in claim 1 in which
   said feeding is by gaseous suspension of the resin.

References Cited

UNITED STATES PATENTS

| | | | |
|---|---|---|---|
| 2,737,461 | 3/1956 | Heisler et al. | 117—97 X |
| 3,063,860 | 11/1962 | Gemmer | 117—18 |
| 3,142,579 | 7/1964 | Brooks | 117—18 |
| 3,186,860 | 6/1965 | Jones | 117—18 X |
| 3,207,618 | 9/1965 | De Hart | 117—18 |
| 3,231,948 | 2/1966 | Dempsey | 117—95 |
| 3,264,131 | 8/1966 | Nagel | 117—18 X |

RALPH S. KENDALL, *Primary Examiner.*